Nov. 9, 1948.  W. J. SPRONG  2,453,468

SPRING STEEL SHOE WITH RUBBER SOLE

Filed March 29, 1945

INVENTOR.
WILLIAM J. SPRONG

BY *Victor J. Evans & Co.*
ATTORNEYS

Patented Nov. 9, 1948

2,453,468

UNITED STATES PATENT OFFICE 2,453,468

SPRING STEEL SHOE WITH RUBBER SOLE

William J. Sprong, Alhambra, Calif.

Application March 29, 1945, Serial No. 585,508

2 Claims. (Cl. 152—249)

The invention relates to spring steel tires equipped with rubber soles.

An object of the invention is to fabricate a spring steel tire from material that will give both flexibility and strength.

Another object of the invention is to eliminate the use of inner tubes and yet obtain the same cushioning effect as received by the use of inner tubes.

A further object of the invention is to provide a spring steel tire that will save rubber.

A still further object of the invention is to provide a tire that is free from punctures and blowouts.

Other objects and advantages will appear in the following specification and the novel features of the invention will be particularly pointed out in the appended claims.

The invention being illustrated in the accompanying drawing forming part of this application in which.

Figure 1:
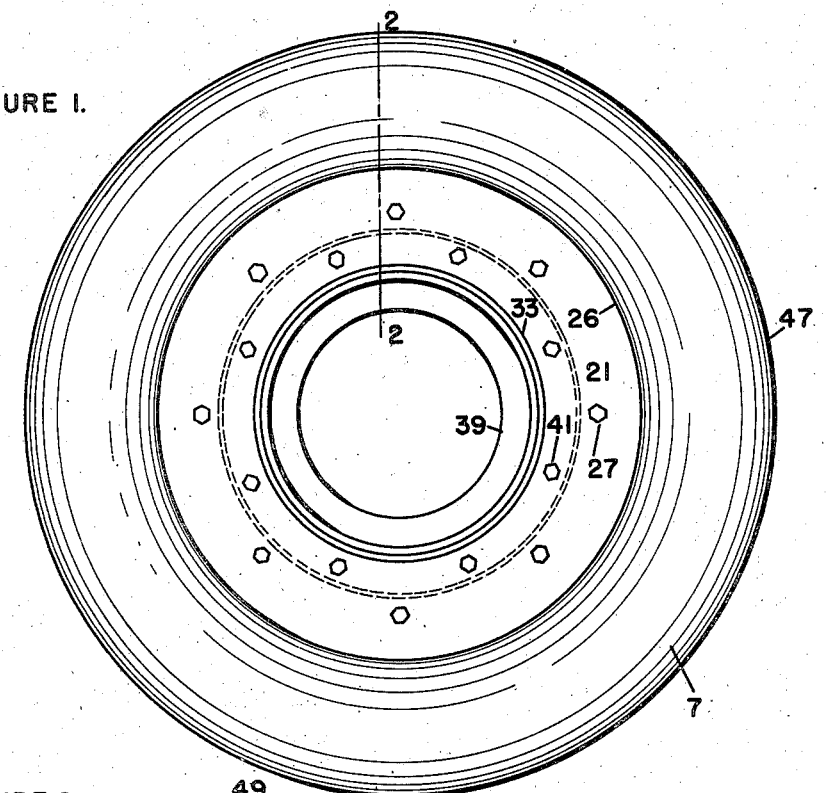
Figure 1 is a side elevation of the device applied to a vehicles wheel.
Figure 2:
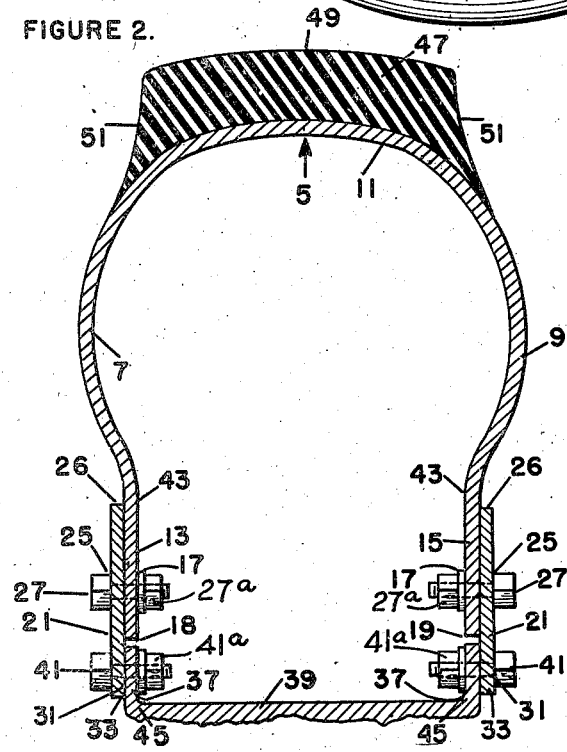
Figure 2 is an enlarged section along the line 2—2 of Figure 1.

Referring now more in detail to the drawings wherein similar numerals of reference indicate corresponding parts in all figures, the numeral 5 indicates a tire body or casing constructed of flexible material, for example, spring steel and of a configuration substantially that of an ordinary tire casing.

The casing 5 has resilient arcuate side portions 7 and 9. The portions 7 and 9 have their centers spaced apart and are formed integral with an arcuate shaped tread receiving portion 11.

Integral with the side portions 7 and 9 and extending downwardly therefrom are flange engaging portions 13 and 15.

These flange portions are provided with relatively spaced openings 17 arranged circumferentially in the side portions 7 and 9 adjacent the peripheries 18 and 19 thereof.

Circular flanges 2, having openings 25 therein adjacent to the outer or upper periphery 26 thereof are adapted to be positioned on the side portions 7 and 9 in such a manner that the openings 17 and 25 are in alignment with each other.

Retaining or fastening means such as bolts 27, are inserted through the aligned opening to firmly secure the circular flanges 21 to the flange portions 18 and 19 of the side portions 7 and 9.

The flange 21 have a second series of openings 31 adjacent the inner or lower periphery 33 thereof and these openings 31 are in staggered relation to the openings 25 and are adapted to be aligned with a similar opening 31 in the rim head 37 of a vehicle wheel 39.

Fastening means such as bolts 41, are adapted to be received in the aligned opening 31 to securely retain the flanges 21 on the rim head 37 of the vehicle wheel 39. The nuts 27a for the bolts 27 and the nuts 41a for the bolts 41 are secured by welding or in any other suitable manner to the inner sides of the side portions 7 and 9, and to the inner sides of the rim head 37 of the vehicle wheel 39 respectively.

When assembled, the upper periphery 26 of the flanges 21 extend to the junction point 43 of the side portions 7 and 9 and flange engaging portions 13 and 15.

The lower periphery 33 extends to the junction point 45 of the rim head 37 and the wheel 39.

This arrangement provides a strong assembly which will withstand road shocks and eliminates the danger of breakage at the assembly points of connection.

A tread member 47 of rubber or similar material is applied to the tread portion 11 to assist in absorbing the shocks to which the wheel will be subjected and to obviate the occurrence of noise as the rotating wheel contacts the ground.

The tread member 47 is of circular formation and is adapted to snugly fit and be firmly secured to the tread portion 11 of the casing 5.

The tread member 47 is rounded upon its bearing surface 49 and the sides 51 are inwardly inclined so that the width of the tread member 47 decreases inwardly as the side 51 approaches the bearing surface 49.

From the foregoing, it is apparent that there has been provided an extremely simple and yet thoroughly efficient device for attaining the objects set forth.

The tire is constructed in such a manner that sufficient flexibility is obtained throughout the extent of the casing 5 by means of the material from which it is made, and will absorb the shocks in a similar manner as if the casing were made of rubber.

The tread member being formed of rubber assists in absorbing shocks, gives traction to the tire and deadens the noise which would be caused by the engagement of the metal casing with the ground.

It is to be understood that the embodiment herein disclosed is merely illustrated and it is obvious that various changes in the minor details of construction and arrangement of parts may be resorted to without departing from the spirit

Having thus described the invention, what is claimed as new and desired to be secured by Letters Patent is:

1. A device of the type described, comprising a tempered spring steel body having resilient arcuate side portions and an arcuate tread receiving portion formed integral therewith a rubber traction tread member secured to the outer surface of said tread receiving portion, circular flange engaging portions depending from said side portions, and circular flanges having staggered relatively spaced openings therein engaging the outer faces of said flange engaging portions for connecting said flange engaging portions to a vehicle wheel head.

2. The invention as described in claim 1 wherein relatively spaced openings are provided in said wheel head and said flange engaging portions in alignment with the openings in said circular flanges and means are provided to securely fasten said flange to said head and said side portions of said body.

WILLIAM J. SPRONG.

REFERENCES CITED

The following references are of record in the file of this patent:

UNITED STATES PATENTS

| Number | Name | Date |
|---|---|---|
| 602,934 | Buchanan | Apr. 26, 1898 |
| 608,691 | Lloyd | Aug. 9, 1898 |
| 868,207 | Monfort | Oct. 15, 1907 |
| 1,156,348 | Frees | Oct. 12, 1915 |
| 1,241,453 | Vanblom | Sept. 25, 1917 |
| 1,666,373 | Feldheim | Apr. 17, 1928 |

FOREIGN PATENTS

| Number | Country | Date |
|---|---|---|
| 359,939 | France | 1906 |